United States Patent [19]

Bhagwat et al.

[11] Patent Number: 5,742,490
[45] Date of Patent: Apr. 21, 1998

[54] POWER CONVERTER HAVING A CONFIGURABLE OUTPUT STAGE

[75] Inventors: Pradeep Madhav Bhagwat, Baltimore, Md.; Chadd Dial Justo, Jersey City, N.J.

[73] Assignee: Electronic Measurements, Inc., Neptune, N.J.

[21] Appl. No.: 739,409

[22] Filed: Oct. 29, 1996

[51] Int. Cl.$^6$ .................................................. H02M 3/335
[52] U.S. Cl. .............................. 363/17; 363/61; 363/98
[58] Field of Search .............................. 363/17, 59, 60, 363/61, 97, 98, 131, 132, 135, 136, 141, 144

[56] References Cited

U.S. PATENT DOCUMENTS

| | | | |
|---|---|---|---|
| 4,442,482 | 4/1984 | Gallios | 363/61 |
| 5,132,889 | 7/1992 | Hitchcock et al. | 363/17 |
| 5,166,965 | 11/1992 | Collier | 363/61 X |
| 5,592,367 | 1/1997 | Sugimori et al. | 363/17 |

*Primary Examiner*—Adolf Berhane
*Assistant Examiner*—Y. J. Han
*Attorney, Agent, or Firm*—Michaelson & Wallace; Peter L. Michaelson; John C. Pokotylo

[57] ABSTRACT

Flexible power converters in which many different output power configurations (i.e., different output voltages and currents) may be realized. In particular, a flexible power converter having an output stage configurable as a full bridge having series or parallel secondary windings, a current doubler having series or parallel secondary windings, or a voltage doubler having series or parallel secondary windings.

15 Claims, 15 Drawing Sheets

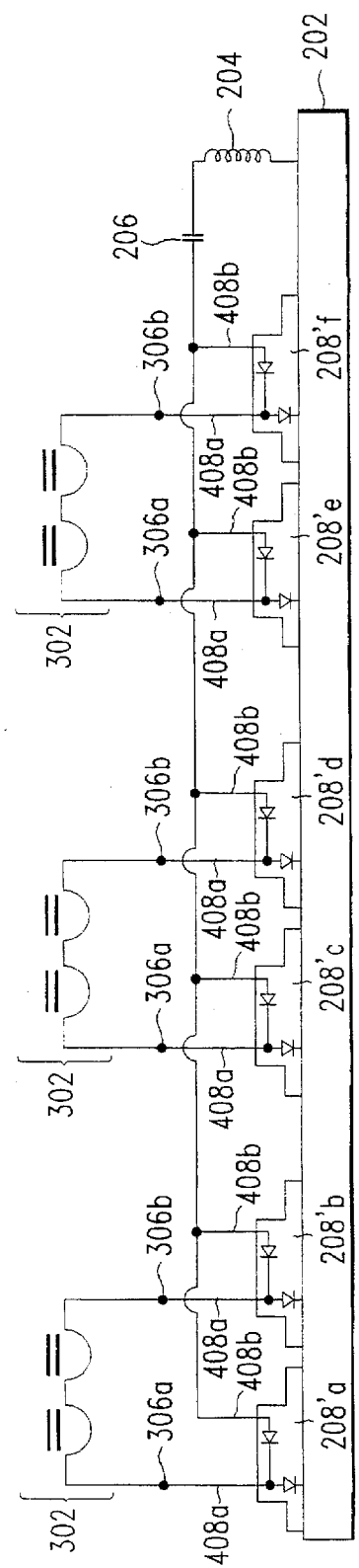
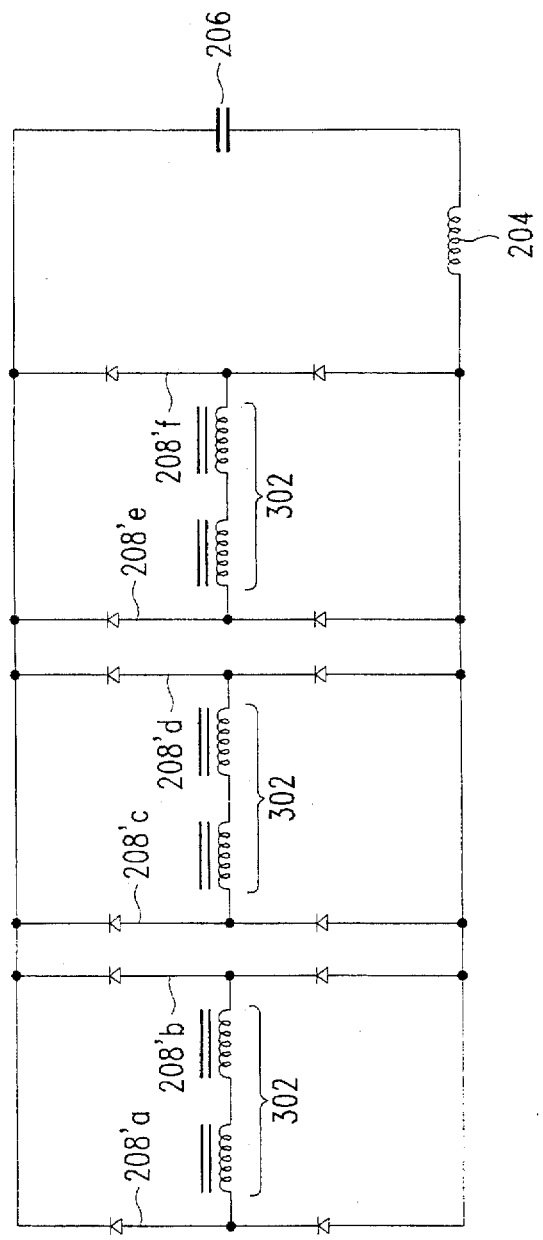
FIG. 5a
FIG. 5b

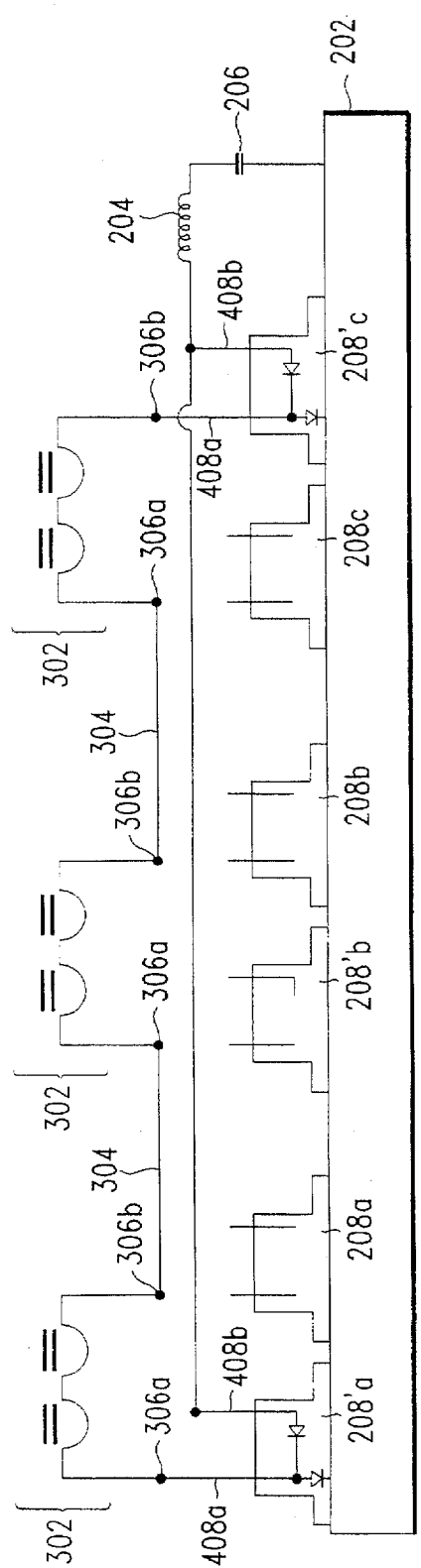
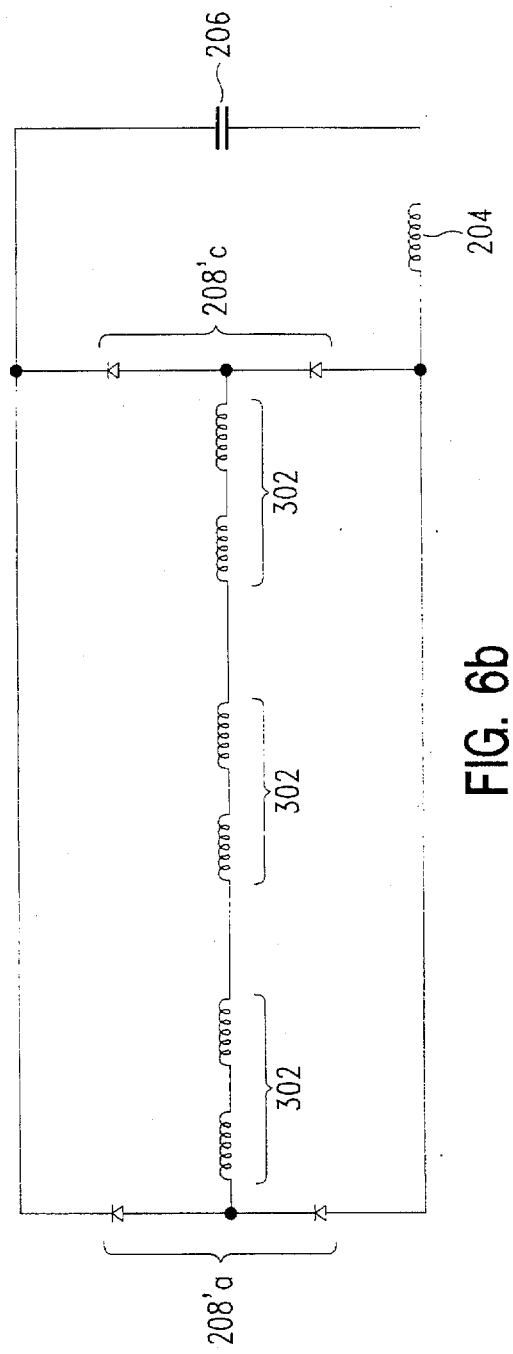
FIG. 6a
FIG. 6b

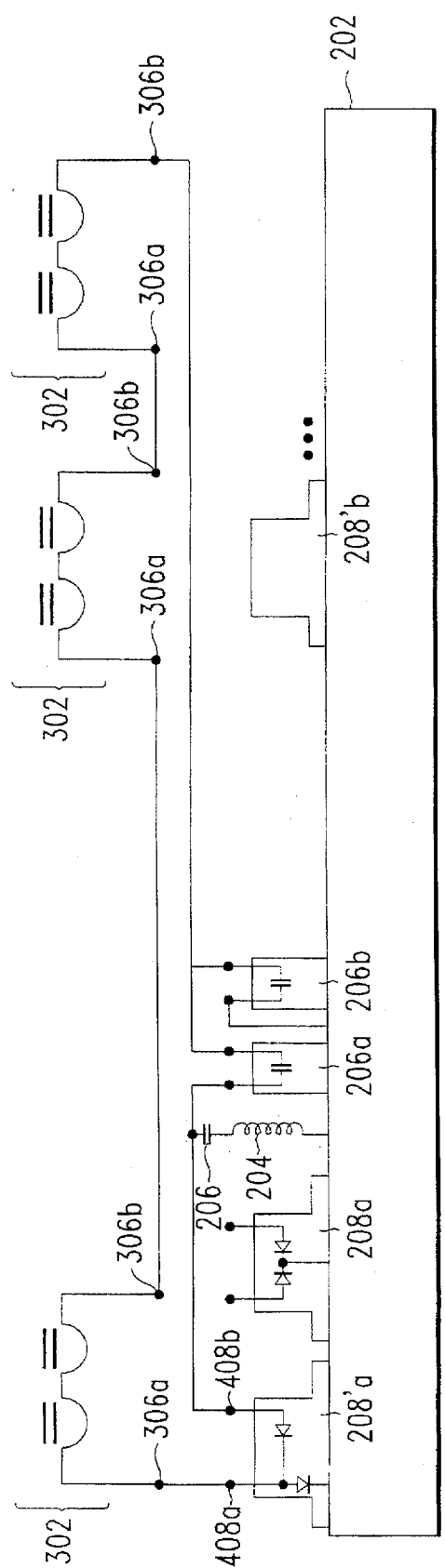
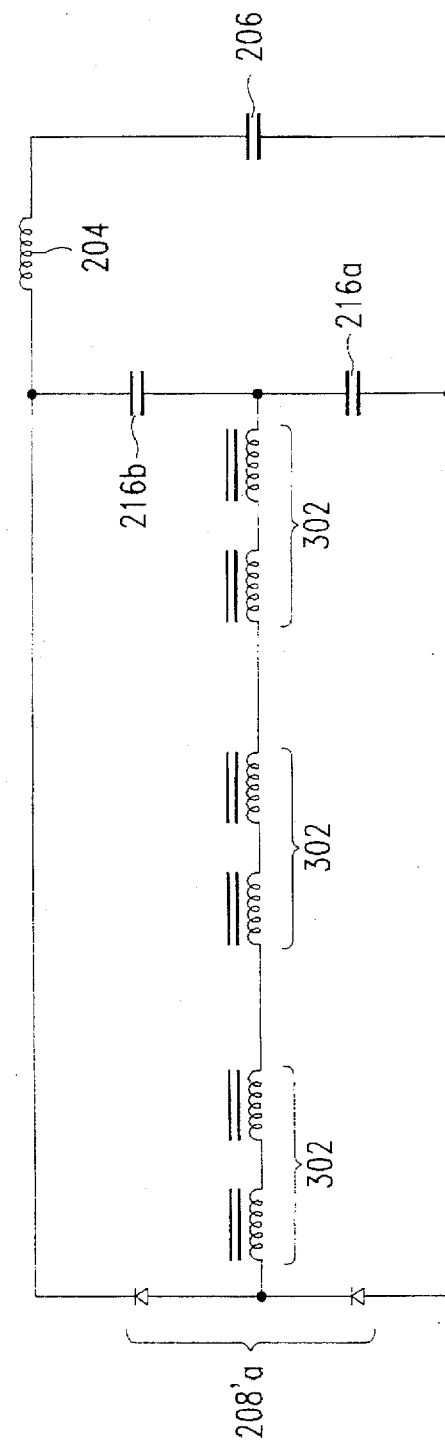
FIG. 8a
FIG. 8b

POWER CONVERTER HAVING A CONFIGURABLE OUTPUT STAGE

BACKGROUND OF THE INVENTION a. Field of the Invention

The present invention concerns flexible power converters in which many different output power configurations (i.e., different output voltages and currents) may be realized. In particular, the present invention concerns a flexible power converter having a configurable output stage.

b. Description of the Related Art

Power supply manufacturers often must meet a broad range of customer requirements. Indeed, manufacturers not narrowly focused on specialized "niche" markets, such as logic circuit power supplies of +5 V or +3.2 V or linear circuit supplies of +/−12 V or +/−15 V for example, must virtually design a new power supply for each new customer. In most instances, a new transformer and choke must be designed before the manufacturing cycle even begins. It typically takes weeks before new units are produced. Thus, each new power supply design typically requires (i) a new transformer, (ii) new documentation, schematics, bill of materials, etc., (iii) a new engineering manual (sometimes a legal requirement), and (iv) new parts to stock, new documentation for parts, etc. Moreover, the time from output power specification to delivery is typically at least six (6) to eight (8) weeks.

These overhead costs of design, logistics, and documentation are significant to most power supply manufacturers. If production volume is low, these overhead costs associated with a new design are particularly burdensome.

In view of the problems associated with the custom design of power converters for particular power output specifications, particularly at low production runs, a single, easily configurable power supply, having a wide range of possible output voltages and currents is needed.

SUMMARY OF THE INVENTION

The present invention solves the aforementioned problems by providing a power supply in which its highest output voltage configuration is twelve (12) times its lowest output voltage configuration using the same or similar components, namely the same transformers and chokes (which are the most expensive components) the same capacitors, the same diode packages and easily interchangeable printed circuit boards (e.g., printed circuit boards having a common footprint).

Moreover, although the power supply of the present invention has various output voltage configurations, only one set of documentation is required, wherein all variations are described by a fixed nomenclature.

Furthermore, the power supply of the present invention is configured at the end of the production line or at the quality control level using either a particular printed circuit board or a system of jumpers.

For low volume production or rapid response delivery, premium voltage rating components (such as semiconductors, switches, diodes, and capacitors) can be used. For high volume production, lower cost, low voltage rating components, having the same footprint as the premium voltage rating components, may be used. Thus, the single power supply design of the present invention may be configured as a custom, rapid response, low volume product, or a high volume, low cost product.

BRIEF DESCRIPTION OF THE DRAWINGS

FIG. 4a is a perspective view of a common cathode dual diode package, while

FIG. 5a is a schematic illustrating the secondary side of FIGS. 2a and 2b configured in a full bridge, parallel arrangement.

FIG. 5b is a circuit diagram showing the resulting circuit of the full bridge, parallel arrangement of FIG. 5a.

FIG. 6a is a schematic illustrating the secondary side of FIGS. 2a and 2b configured in a full bridge, series arrangement.

FIG. 6b is a circuit diagram showing the resulting circuit of the full bridge, series arrangement of FIG. 6a.

FIG. 7b is a circuit diagram showing the resulting circuit of the voltage doubler, parallel arrangement of FIG. 7a.

FIG. 8a is a schematic illustrating the secondary side of FIGS. 2a and 2b configured in a voltage doubler, series arrangement.

FIG. 8b is a circuit diagram showing the resulting circuit of the voltage doubler, series arrangement of FIG. 8a.

FIG. 9b is a circuit diagram showing the resulting circuit of the current doubler, parallel arrangement of FIG. 9a.

FIG. 10b is a circuit diagram showing the resulting circuit of the current doubler series arrangement of FIG. 10a.

DETAILED DESCRIPTION

Figure 1:
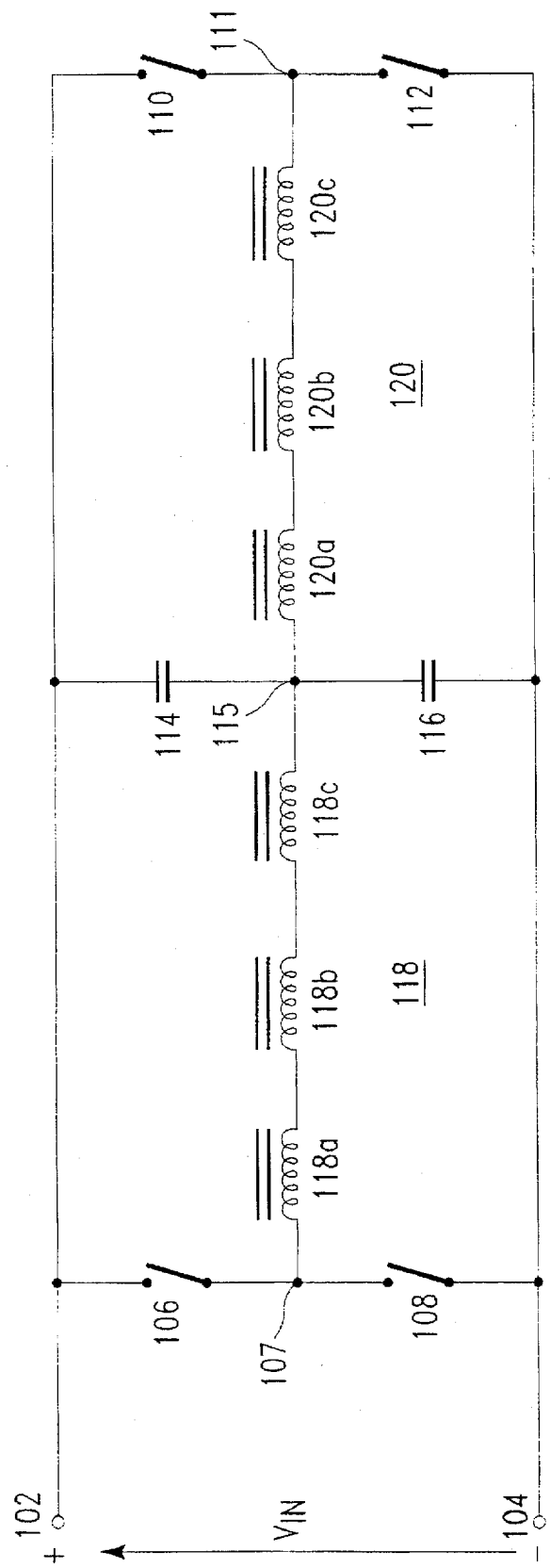
FIG. 1 is a schematic diagram of a primary side of a dual half bridge power converter.

FIG. 1 is a schematic of an exemplary primary side which may be used with the configurable power supply of the present invention. The primary side of the power supply is typically non-configurable. In this case, the primary stage of a dual half bridge power converter is shown. An input voltage is to be supplied across input terminals 102 and 104. A voltage divider consisting of capacitors 114 and 116 is coupled across the input terminals 102 and 104. The series connection of the capacitors 114 and 116 defines a divided voltage node 115 between the two capacitors. A first switching network of controllable switches (e.g., FETs) 106 and 108 is also coupled across the input terminals 102 and 104. The series connection of the controllable switches 106 and 108 define a first switching node 107 between the two controllable switches. Similarly, a second switching network of controllable switches (e.g., FETs) 110 and 112 is coupled across the input terminals 102 and 104. The series connection of the controllable switches 110 and 112 defines a second switching node 111 between the controllable switches. The controllable switches 106, 108, 110, and 112 are controlled such that switches 106 and 112 are closed at the same time, while switches 108 and 110 are opened, and such that switches 108 and 110 are closed at the same time, while switches 106 and 112 are opened, thereby creating an alternating waveform across the primary winding(s) of the transformer.

The primary winding of the transformer is divided into six (6) parts. A first series connection 118 of the primary is arranged between the first switching node 107 and the divided voltage node 115 and a second series connection 120 of the primary is arranged between the divided voltage node 115 and the second switching node 111. The first series connection 118 includes three, series connected, windings 118a, 118b and 118c. Similarly, the second series connection 120 includes three, series connected, windings 120a, 120b, and 120c.

Although FIG. 1 illustrates the primary side as having a dual half bridge topology, the primary side may be defined by another switching power converter topology. The important aspect of the primary side is that the primary winding is divided into a number of primary windings, in this case six (6). For purposes of the present invention, the configuration of the primary side is fixed.

Figure 2A:
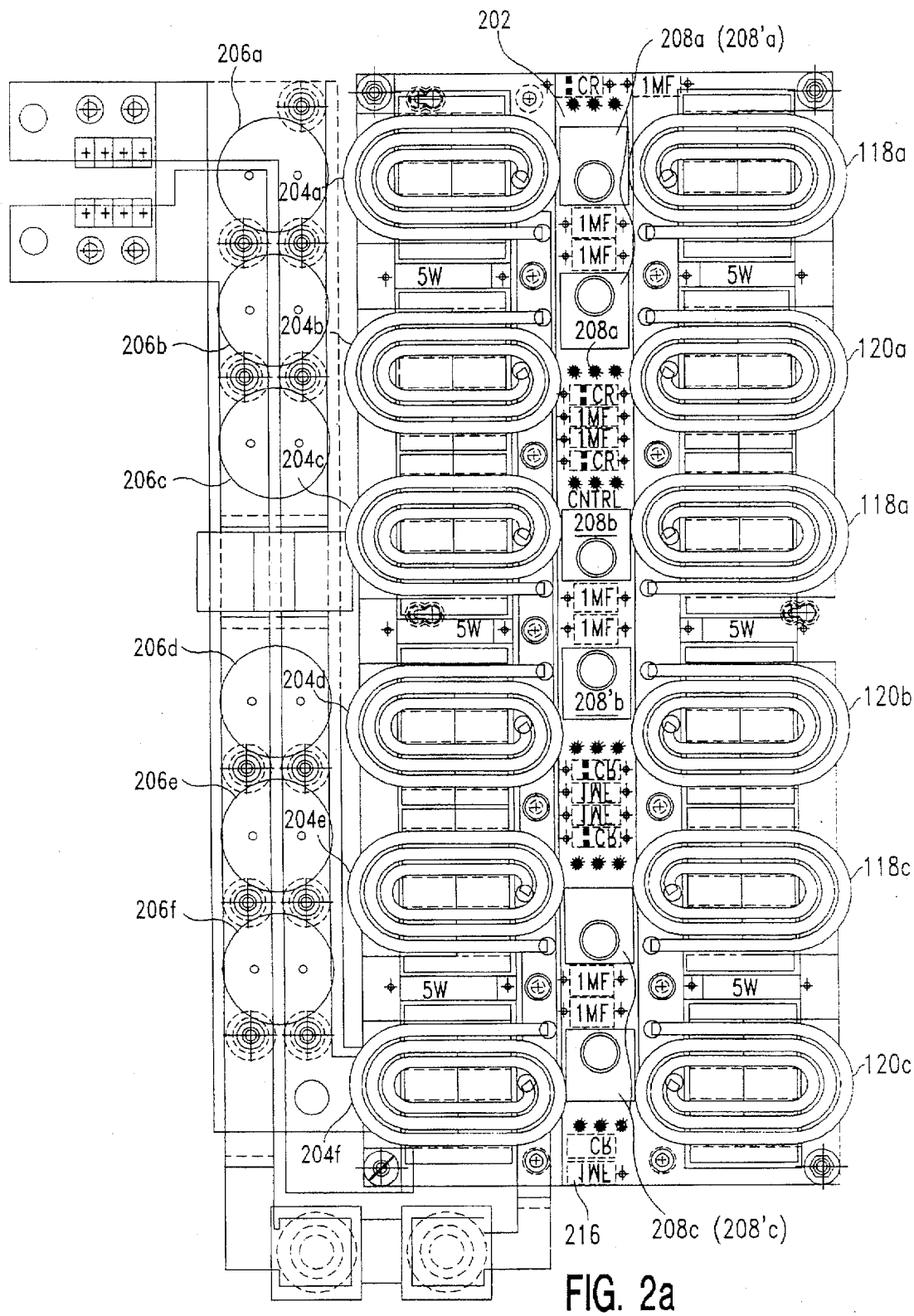
FIG. 2a is a plan view.
Figure 2B:
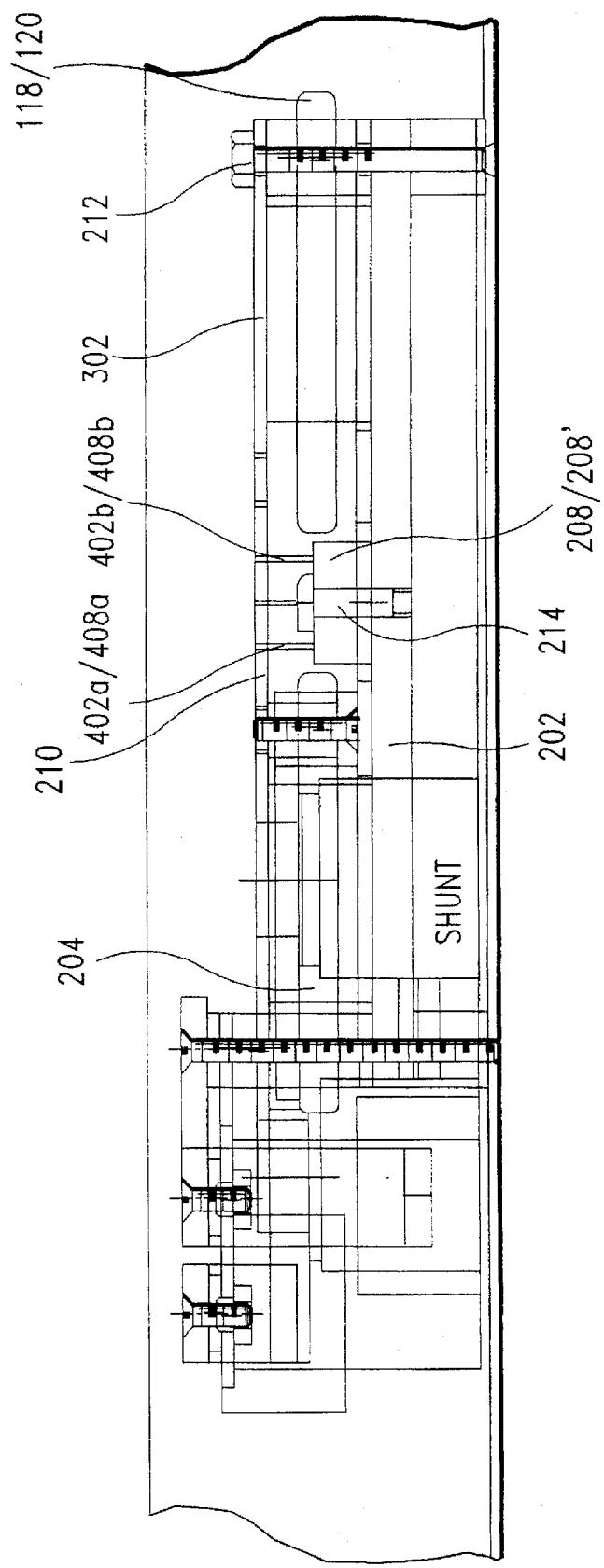
FIG. 2b is an end view, of a power supply of the present invention having a configurable secondary side (or output stage).

FIG. 2a is a plan view which illustrates the structure of the secondary side and FIG. 2b is a end view of FIG. 2a. The series of primary windings 118a, 120a, 118b, 120b, 118c and 120c are shown on the right sides of FIGS. 2a and 2b. In one embodiment of the present invention, each of these windings consists of four (4) turns of number 12 wire.

Figure 3:
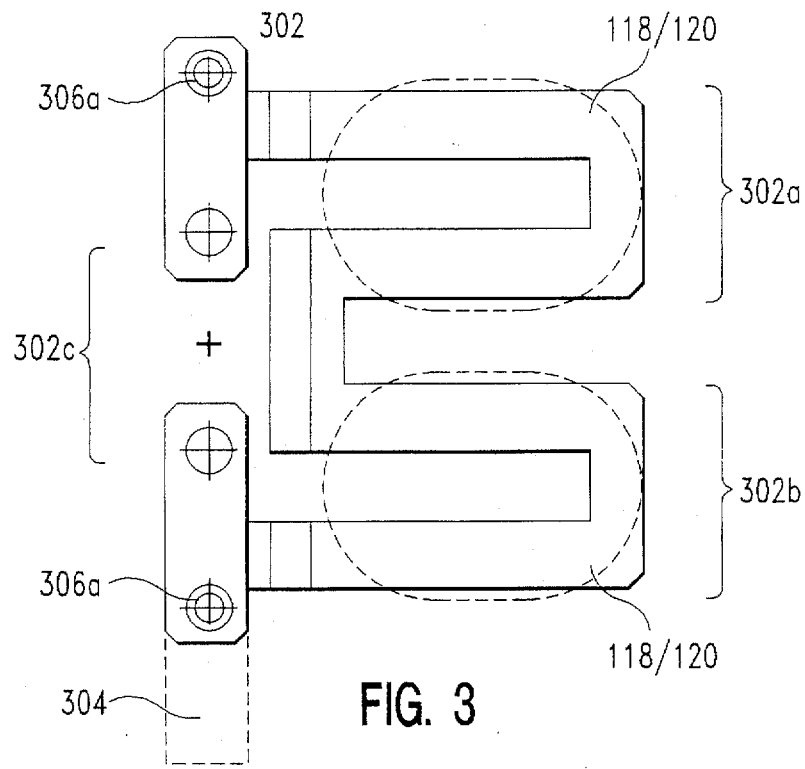
FIG. 3 is a plan view of a stamped secondary of the transformer used in the power supply of the present invention.

A pair of single turn secondaries 302 (not shown in FIG. 2a; see FIG. 2b) is arranged over two adjacent primary windings. Thus, three (3) pairs of single turn secondaries 302 are arranged over the six (6) primary windings. As shown in the plan view of FIG. 3, each of the three (3) pairs of single turn secondaries 302 includes a first single turn secondary 302a coupled with a second single turn secondary 302b via a link 302c. Each of the pairs of single turn secondaries 302 are bolted to (but electrically isolated from) a heat sink 202 via a diode package 208 or 208' by means of through holes 306a and 306b. The heat sink may include a machined aluminum plate for example. Alternatively, as shown in FIG. 2b, the secondaries 302 may be bolted to (but electrically isolated from) the heat sink 202 via bolts 212 and diode packages 208 and 208' may be separately bolted to the heat sink 202 with bolts 214. Adjacent pairs of single turn secondaries 302 may be joined with link 304 (shown in phantom in FIG. 3). Alternatively, adjacent pairs of single turn secondaries 302 may be coupled via a conductor pattern on the topside or underside of a printed circuit board 210. If the pairs of single turn secondaries 302 are coupled via a conductor pattern on the topside of the printed circuit board 210, bolts or leads pass through holes of the printed circuit board 210. In one embodiment of the power converter of the present invention, each of the pairs of single turn secondaries 302 is formed by a stamped copper sheet, which may be laminated.

As shown in the plan view of FIG. 2a, the configurable output stage of the present invention includes six (6) spaces for accommodating six (6) dual diode packages, for example, three (3) common cathode dual diode packages 208a–208c and/or three (3) series, head-to-tail, dual diode packages 208'a–208'c. Alternatively, the configurable output stage of the present invention includes (6) series, head-to-tail, dual diode packages on the six (6) spaces. More preferably, the configurable output stage of the present invention may include nine (9) spaces accommodating three (3) common cathode dual diode packages and six (6) series, head-to-tail, dual diode packages. The number of spaces for accommodating dual diode packages depends on the number of secondary windings, as well as the range of output stage configurations desired. In the embodiment described below, there are six (6) series, head-to-tail, dual diode packages or three (3) series, head-to-tail, dual diode packages and three (3) common cathode dual diode packages held in six (6) spaces. The dual diode packages are interchangeable (e.g., they may have the same "footprint"). Such a configurable output stage can be arranged in any one of a full bridge (series or parallel secondaries), voltage doubler (series or parallel secondaries), and current doubler (series or parallel secondaries) configurations without swapping dual diode packages. Although this last embodiment will have unused diodes in each of the six (6) above listed configurations, since the diode packages are relatively inexpensive components, the cost of unused diodes is a small price to pay for the additional flexibility.

Figure 4A:
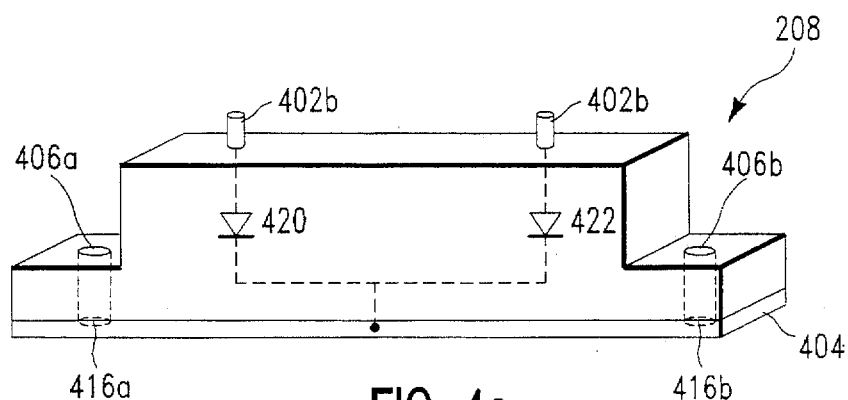
Figure 4B:
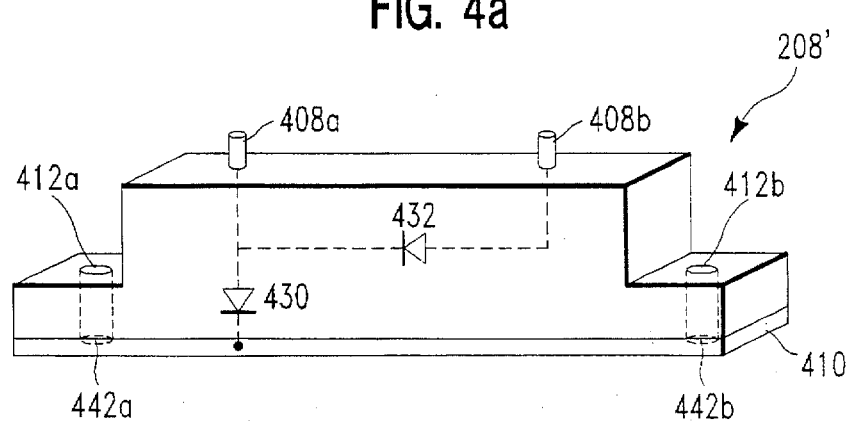
FIG. 4b is a perspective view of a series, "head-to-tail", dual diode package.

FIG. 4a illustrates a common cathode dual diode package 208 while FIG. 4b illustrates a series, head-to-tail, dual diode package 208'. As shown in FIG. 4a, the common cathode diode pair package 208 includes a first terminal 402a, a second terminal 402b, a first flange 406a, a second flange 406b, and a conductive (e.g., metallic) base 404. The diode pair package 208 may be bolted to the heat sink 202, via through holes 416a and 416b defined in the first and second flanges 406a and 406b, respectively, such that the conductive base 404 contacts the heat sink 202. Alternatively, as shown in FIG. 2b, the series, head-to-tail, dual diode package 208 may be bolted via a through hole in its center to the heat sink 202 by means of bolt 214. Internal to the package, a first diode 420 has an anode coupled with the first terminal 402a and a cathode coupled with the conductive base 404 while the second diode 422 has an anode coupled with the second terminal 402b and a cathode coupled with the conductive base 404.

As shown in FIG. 4b, the series, head-to-tail, dual diode package 208' includes a first terminal 408a, a second terminal 408b, a first flange 412a, a second flange 412b, and a conductive (e.g., metallic) base 410. The series head-to-tail, dual diode package 208' is bolted to the heat sink 202, via through holes 442a and 442b defined in the first and second flanges 412a and 412b, respectively, such that the conductive base 410 contacts the heat sink 202. Alternatively, as shown in FIG. 2b, the series, head-to-tail, dual diode package 208' may be bolted via a through hole in its center to the heat sink 202 by means of bolt 214. Internal to the package, a first diode 430 has an anode coupled with the first terminal 408a and a cathode coupled with the conductive base 410 while the second diode 432 has an anode coupled with the second terminal 408b and a cathode coupled with the first terminal 408a.

The diode packages 208 and 208' are inexpensive components relative to the magnetic components, i.e., the chokes and transformer windings. In some configurations, not all of the diode packages 208 or 208' are used.

Returning to FIGS. 2a and 2b, the secondary side of the configurable power supply of the present invention includes six (6) inductors (or chokes) 204a–204f. Each of the six (6)

inductors 204 includes a first terminal end and a second terminal end. To the left of the six (6) inductors is arranged a capacitor bank comprising six (6) capacitors 206a–206f. Each of the six (6) capacitors 206 of the capacitor bank also include a first terminal end and a second terminal end. As shown in the plan view of FIG. 2a, twelve (12) capacitors 216, such as 1 microfarad capacitors, are provided. These capacitors 216 (and the diodes labeled "CR") are used in a snubber circuit on the primary side of the power converter to facilitate lossless switching. The capacitors 216 are not necessary for understanding the configurable output of the present invention. As can be seen, the diode packages 208 and 208' can be arranged into three (3) groups, each group having a common cathode dual diode package 208 and a series, head-to-tail, dual diode package 208'. In the preferred embodiment of the present invention which can accommodate nine (9) dual diode packages, each of the three (3) groups includes a common cathode dual diode package 208 and two (2) series head-to-tail, dual diode packages 208'.

As shown in the end view of FIG. 2b, the configurable power supply of the present invention also includes a printed circuit board 210. The underside of the printed circuit board 210 is physically adjacent to each of the first and second terminals 402 or 408 of the dual diode packages 208 or 208', respectively, as well as the first and second terminal ends of each of the six (6) inductors and six (6) capacitors. The terminals of these elements may physically contact a conductor pattern (by a contact means known to those skilled in the art, such as spring loaded contacts for example) on the underside of the printed circuit board 210. The printed circuit board may include through holes for permitting element terminals to pass through to the upper side of the printed circuit board 210, which may also include a conductor pattern. The terminals may then be connected to the conductor pattern on the upper side of the printed circuit board 210 in a known matter, such as soldering for example.

The conductor patterns are formed by methods known to those skilled in the art. The following describes examples of output stages that can be configured by using different printed circuit boards 210 having different conductor patterns.

Although connections between terminals of these elements are described below as being realized with conductor patterns on the printed circuit board 210, a system of jumpers, or a combination of jumpers and conductor patterns may be used. However, realizing the connections with conductor patterns on the printed circuit is preferred.

FIG. 5a is a schematic which illustrates the secondary side of FIGS. 2a and 2b configured in a full bridge, parallel arrangement. As shown in FIG. 5a, six (6) series, head-to-tail, dual diode packages 208'a–208'f are coupled with head sink 202 by means of bolts (not shown) passing through the through holes 412a and 412b (See FIG. 4b) of the diode packages 208'a–208'f. Any common cathode dual diode packages 208a–208c are not used in this arrangement. In each of the three (3) pairs of single turn secondaries 302, a first side 306a is coupled with a first terminal 408a of the series, head-to-tail, dual diode package 208'a, 208'c, or 208'e while a second side 306b is coupled with a first terminal 408a of an adjacent series, head-to-tail, dual diode package 208'b, 208'd, or 208'f, respectively. The second terminals 408b of the series, head-to-tail, dual diode packages 208'a–208'f are coupled together by means of a conductor pattern on the printed circuit board 210. As shown generally in FIG. 5a, one or more of the inductors 204a–204f and capacitors 206a–206f are coupled, via a conductor path on the printed circuit board, between the second terminals 408b of the series, head-to-tail, dual diode packages 208'a–208'f, and the heat sink 202. Thus, in this arrangement, the three (3) common cathode dual diode packages 208a–208c are not used. In the preferred embodiment in which six (6) series, head-to-tail, dual diode packages 208 and three (3) common cathode dual diode packages 208 are provided on nine (9) spaces, three (3) of the series, head-to-tail, dual diode packages 208' are unused. Each of the secondaries are inductively coupled with a section 118a, 118b, 118c, 120a, 120b, and 120c of the primary winding. (Not shown; See FIGS. 1, 2a, and 2b.)

FIG. 5b is a circuit diagram showing the resulting circuit of the full bridge parallel arrangement of FIG. 5a. Assuming, for example, that 10 volts is generated across each of the one turn secondaries, 20 volts is provided across the output capacitor(s) 206. The single turn secondary pairs 302 are not directly connected in parallel, but rather, are connected in parallel through diodes. If these diodes were not provided, small differences of the turns in the single turn secondary pairs 302 could lead to undesirable circulating currents.

FIG. 6a is a schematic which illustrates a series, full bridge arrangement. To configure the secondaries in series, links 304 may be used to couple the pairs of single turn secondaries 302. Alternatively, a conductor pattern on the printed circuit board 210 may be used to couple the pairs of single turn secondaries 302 in series. As is further shown in FIG. 6a, the first terminal 408a of the series, head-to-tail, dual diode package 208'a is coupled with a first terminal 306a of a first of the pairs of single turn secondaries 302, while the first terminal 408a of the series, head-to-tail, dual diode package 208'c is coupled with a second terminal 306b of a third of the pairs of single turn secondaries 302. Furthermore, the second terminal 408b of the series, head-to-tail, dual diode package 208'a is coupled, via a conductor pattern on the printed circuit board 210, with the second terminal 408b of the series, head-to-tail, dual diode package 208'c. As shown generally in FIG. 6a, one or more of the inductors 204a–204f and capacitors 206a–206f are coupled, via a conductor path on the printed circuit board, between the second terminals 408b of the series, head-to-tail, dual diode packages 208'a and 208'c, and the heat sink 202. Thus, in this arrangement, one (1) series, head-to-tail, dual diode package 208' and three (3) common cathode dual diode packages 208' are unused. In the preferred embodiment in which six (6) series, head-to-tail, dual diode packages 208' and three (3) common cathode dual diode packages 208 are provided on nine (9) spaces, four (4) of the series, head-to-tail, dual diode packages 208' are unused.

FIG. 6b is a circuit diagram showing the resulting circuit of the full bridge series arrangement of FIG. 6a. Assuming, for example, that 10 volts is generated across each of the one turn secondaries, 60 volts is provided across the output capacitor(s) 206.

Thus, a comparison of FIGS. 5a and 6a shows that the configurable secondary of the present invention may be easily configured either to a parallel full bridge having a 20 volt output or a series full bridge having a 60 volt output, merely depending on the printed circuit board 210 and/or connectors 304 used.

Figure 7A:
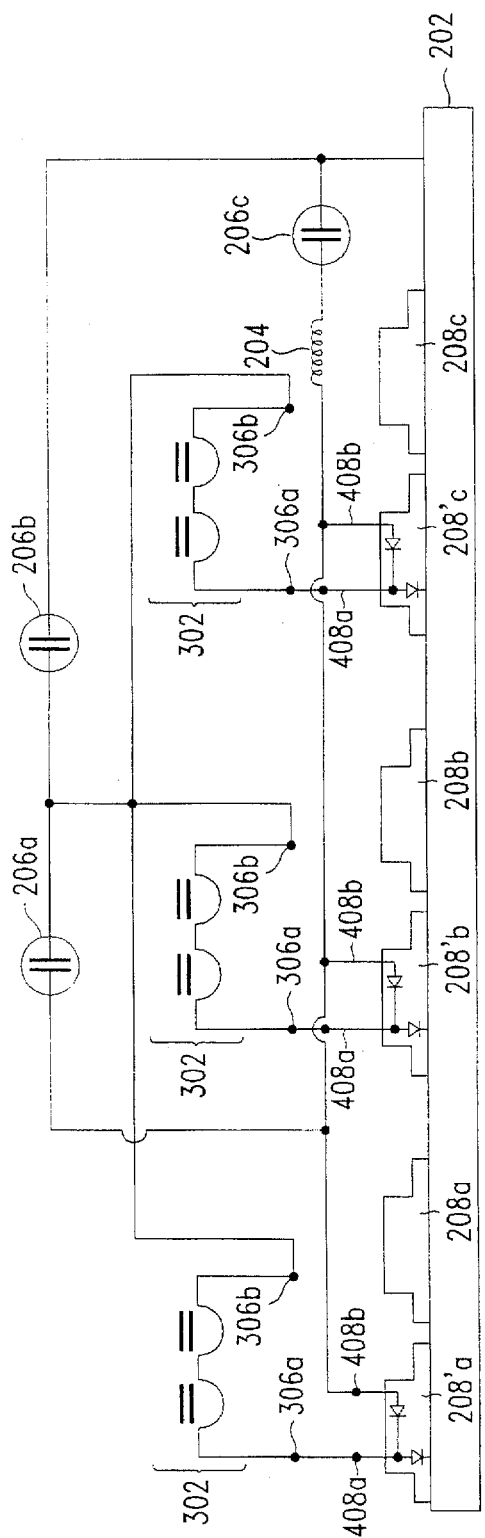
FIG. 7a is a schematic illustrating the secondary side of FIGS. 2a and 2b configured in a voltage doubler, parallel arrangement.

FIG. 7a is a schematic illustrating the secondary side of FIGS. 2a and 2b configured in a voltage doubler, parallel arrangement. The first terminal 306a of each of the three (3) pairs of single turn secondaries 302 is coupled with the first terminal 408a of an associated series, head-to-tail, dual diode package 208'a, 208'b, or 208'c. The second terminal 306b of each of the three (3) pairs of single turn secondaries 302 is coupled with a first terminal of a first capacitor (e.g., 206a) and a first terminal of a second capacitor (e.g., 206b) of the capacitor bank. A second terminal of the first capacitor 206a is coupled with the second terminal 408b of each of the series, head-to-tail, dual diode packages 208'a–208'c. The second terminal of the second capacitor 206b is coupled with the heat sink 202. As shown generally in FIG. 7a, one or more of the inductors 204a–204f and one or more of the remaining capacitors (e.g., 206c) of the capacitor bank are arranged between the second terminals 408b of the series, head-to-tail, dual diode packages 208'a, 208'b, and 208'c and the heat sink 202. Thus, in this arrangement, the three of the series, head-to-tail, dual diode packages 208' are used but the common cathode dual diode packages 208 are not used. In the preferred embodiment in which six (6) series, head-to-tail, dual diode packages 208' and three (3) common cathode dual diode packages 208 are provided on nine (9) spaces, three (3) of the six (6) series, head-to-tail, dual diode packages 208' are unused. Each of the secondaries are inductively coupled with a section 118a, 118b, 118c, 120a, 120b, or 120c of the primary winding (Not shown; See FIGS. 1, 2a, and 2b).

Figure 7B:
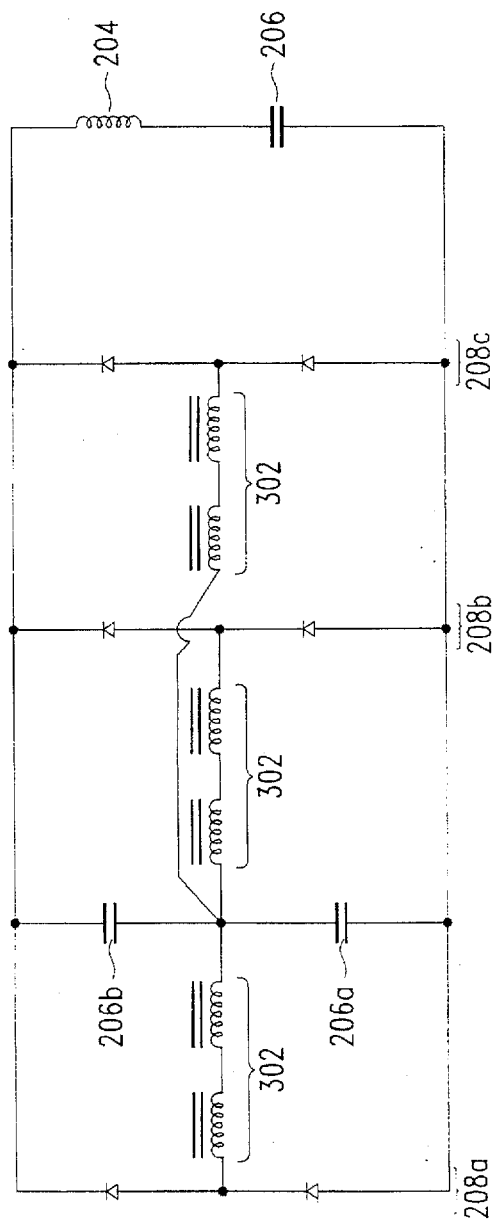

FIG. 7b is a circuit diagram showing the resulting circuit of the voltage doubler, parallel arrangement of FIG. 7a. Assuming, for example, that 10 volts is generated across each of the one turn secondaries, 40 volts is provided across the output capacitor(s) 206.

FIG. 8a is a schematic illustrating the secondary side of FIGS. 2a and 2b configured in a voltage doubler, series arrangement. To configure the secondaries in series, links 304 may be used to couple the pairs of single turn secondaries 302. Alternatively, a conductor pattern on the printed circuit board 210 may be used to couple the pairs of single turn secondaries 302 in series. As is further shown in FIG. 8a, the first terminal 408a of the series, head-to-tail, dual diode package 208'a is coupled with a first terminal 306a of a first of the pair of single turn secondaries 302. A second terminal 306b of the third pair of single turn secondaries 302 is coupled with a first terminal of both capacitors 206a and 206b. A second terminal of the capacitor 206b is coupled with the heat sink 202 while the second terminal of the capacitor 206a is coupled with the second terminal 408b of the series, head-to-tail, dual diode package 208'a, as well as one or more of the remaining capacitors 206c–206f of the capacitor bank. One or more of the inductors 204a–204f is arranged between the other side of the one or more of the remaining capacitors 206c–206f and the heat sink. Thus, in this arrangement, the three common cathode dual diode packages 208a–208c, as well as two (or five in the preferred embodiment) of the series, head-to-tail, dual diode packages 208' are not used. Again, each of the secondaries are inductively coupled with a section 118a, 118b, 118c, 120a, 120b, or 120c of the primary winding.

FIG. 8b is a circuit diagram showing the resulting circuit of the voltage doubler, series arrangement of FIG. 8a. Assuming, for example, that 10 volts is generated across each of the one turn secondaries, 120 volts is provided across the output capacitor(s) 206.

A comparison of FIGS. 7a and 8a shows that the configurable secondary of the present invention may be easily configured either to a parallel voltage doubler having a 40 volt output or a series voltage doubler having a 120 volt output, merely depending on the printed circuit board 210 and/or connectors 304 used.

Figure 9A:
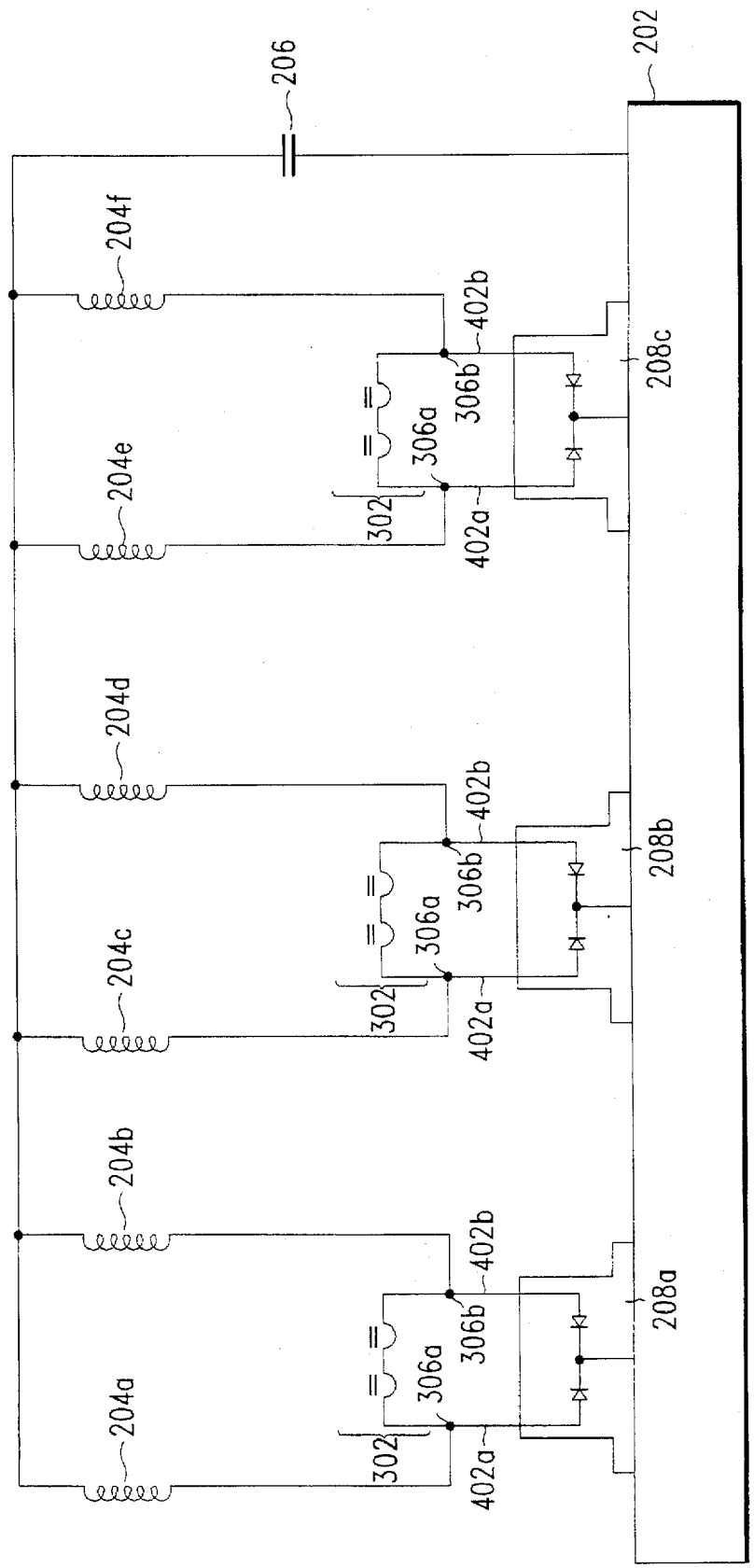
FIG. 9a is a schematic illustrating the secondary side of FIGS. 2a and 2b configured in a current doubler, parallel arrangement.

FIG. 9a is a schematic illustrating the secondary side of FIGS. 2a and 2b configured in a current doubler, parallel arrangement. As shown in FIG. 9a, three (3) common cathode dual diode packages 208a–208c are coupled with head sink 202 by means of bolts (not shown) passing through the through holes 406a and 406b (See FIG. 4a) of the diode packages 208a–208c. In each of the three (3) pairs of single turn secondaries 302, a first side 306a is coupled with the first terminal 402a (or alternatively the second terminal 402b) of a corresponding common cathode dual diode package 208a, 208b, or 208c, as well as a first terminal of a corresponding one of inductors 204a, 204c or 204e. Further, in each of the three (3) pairs of single turn secondaries 302, a second side 306b is coupled with the second terminal 402b (or alternatively the first terminal 402a) of the corresponding common cathode dual diode package 208a, 208b, or 208c, as well as a first terminal of another corresponding inductor 204b, 204d, or 204f. The second terminals of each of the inductors 204a–204f are coupled with one another via a conductor pattern on the printed circuit board 210. In this configuration, none of the series, head-to-tail, dual diode packages 208' are used. One or more of the capacitors 206a–206f are arranged between the second terminals of the inductors 204 and the heat sink 202. Each of the secondaries are inductively coupled with a section 118a, 118b, 118c, 120a, 120b, and 120c of the primary winding (Not shown; See FIGS. 1, 2a, and 2b).

Figure 9B:
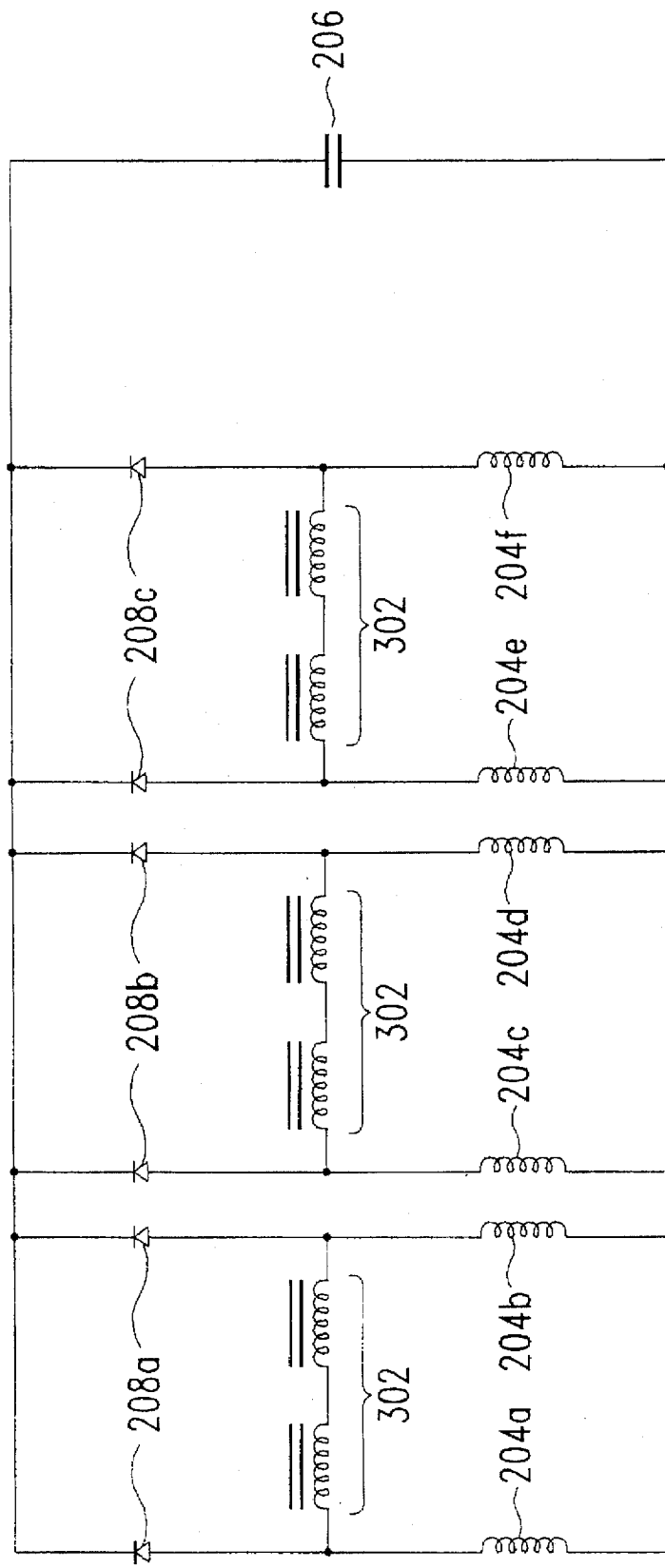

FIG. 9b is a circuit diagram showing the resulting circuit of the current doubler, parallel arrangement of FIG. 9a. Assuming, for example, that 10 volts is generated across each of the one turn secondaries, 10 volts is provided across the output capacitor(s) 206. The single turn secondary pairs 302 are not directly connected in parallel, but rather, are connected in parallel through diodes. If these diodes were not provided, small differences of the turns in the single turn secondary pairs 302 could lead to undesirable circulating currents.

Figure 10A:
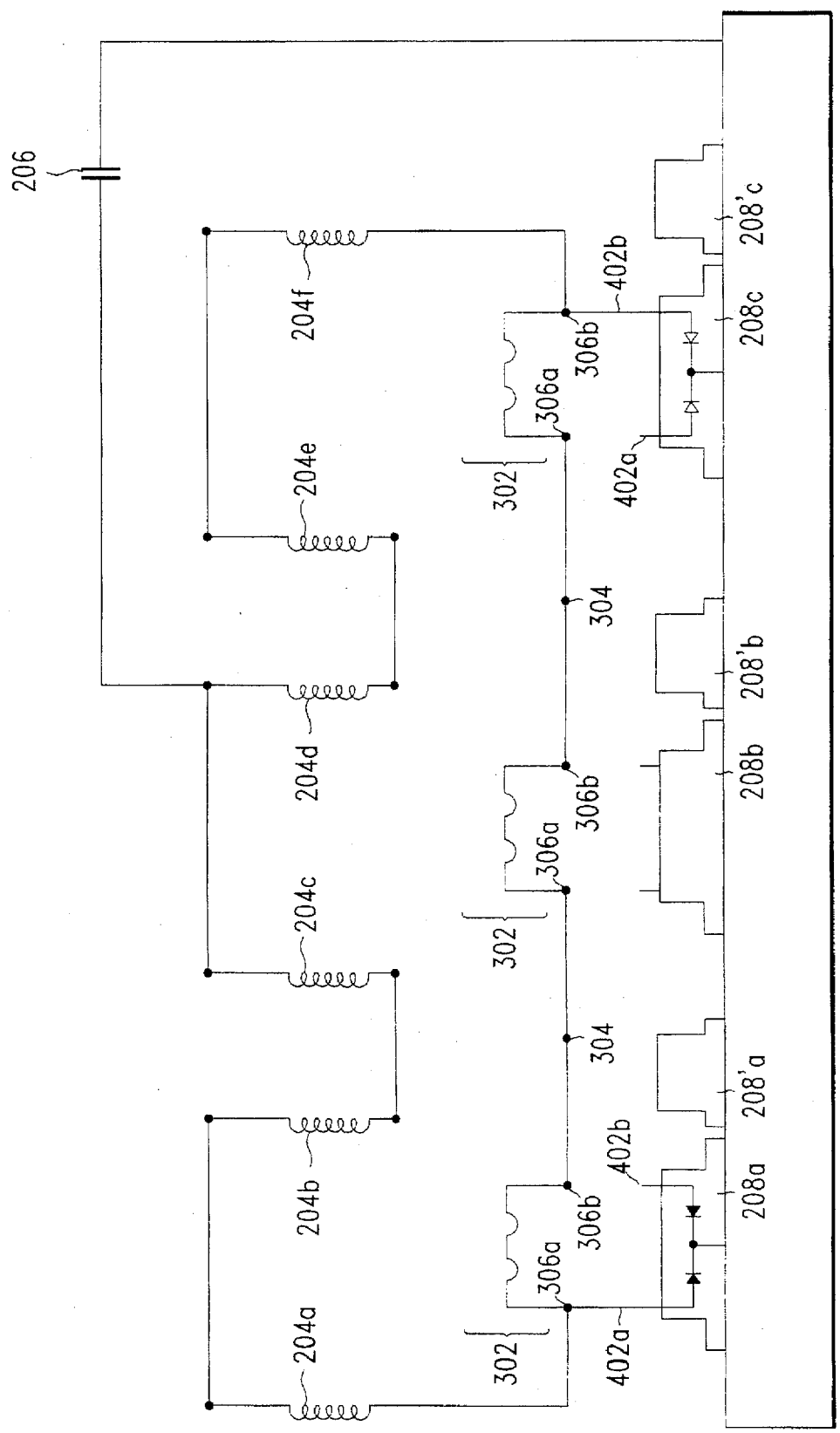
FIG. 10a is a schematic illustrating the secondary side of FIGS. 2a and 2b configured in a current doubler, series arrangement.

FIG. 10a is a schematic which illustrates a series, current doubler arrangement. To configure the secondaries in series, links 304 may be used to couple the pairs of single turn secondaries 302. Alternatively, a conductor pattern on the printed circuit board 210 may be used to couple the pairs of single turn secondaries 302 in series. As is further shown in FIG. 10a, the first (or second) terminal 402a of the common cathode dual diode package 208a is coupled with a first terminal 306a of a first of the three (3) pairs of single turn secondaries 302, while the second (or first) terminal 402b of the dual diode package 208c (or 208a or 208b) is coupled with a second terminal 306b of a third of the three (3) pairs of single turn secondaries 302. Thus, the series, head-to-tail, dual diode packages 208', as well as one (or two) of the common cathode dual diode packages 208, are not used in this configuration. The inductors 204a–204f may be connected in series, for example as shown, via a conductor pattern on the printed circuit board 210, from the first terminal 306a of the first one of the three (3) pairs of single turn secondaries 302 to the second terminal 306b of the third one of the three (3) pairs of single turn secondaries 302. As generally shown in FIG. 10a, one or more capacitors 206 are coupled at a node between two of the inductors, for example between inductors 204c and 204d, and the heat sink 202.

Figure 10B:
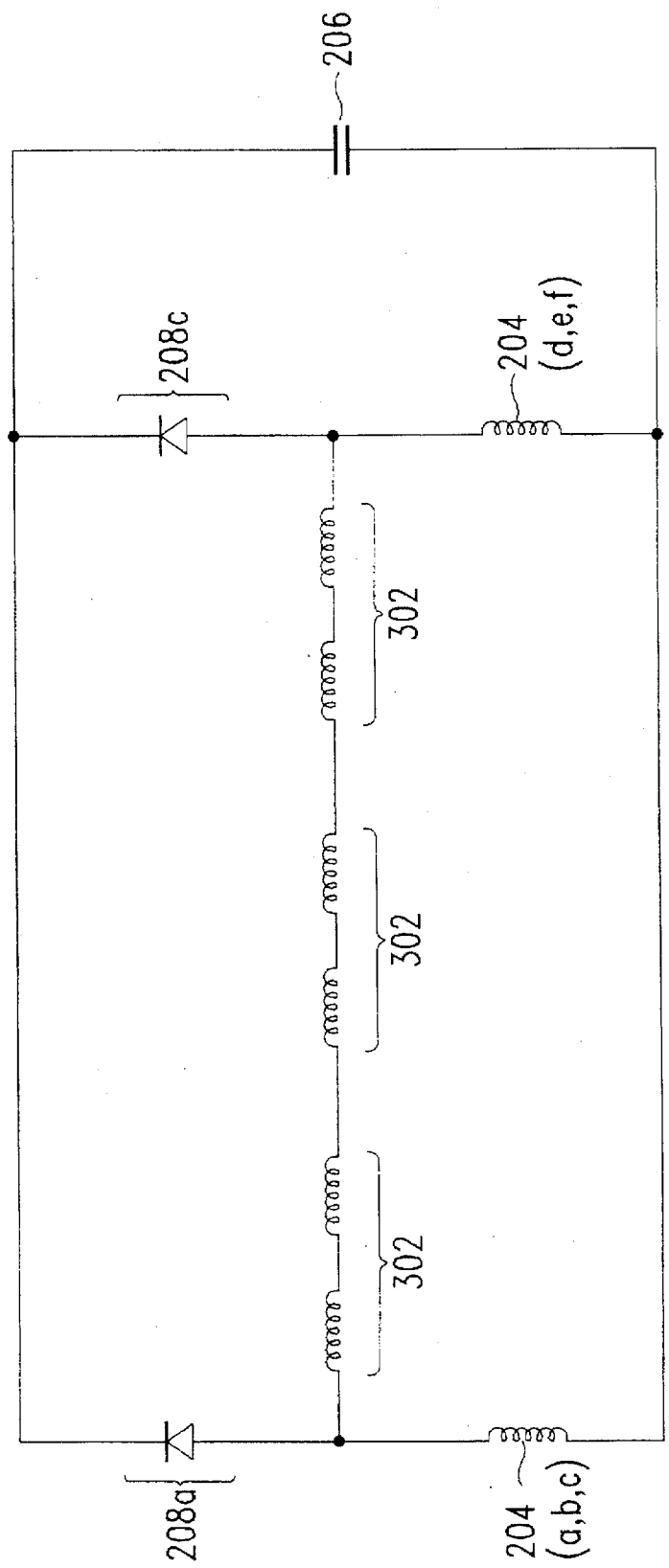

FIG. 10b is a circuit diagram showing the resulting circuit of the current doubler, series arrangement of FIG. 10a. Assuming, for example, that 10 volts is generated across each of the one turn secondaries, 30 volts is provided across the output capacitor(s) 206.

Thus, a comparison of FIGS. 9a and 10a shows that the configurable secondary of the present invention may be easily configured either to a parallel current doubler having a 10 volt output or a series current doubler having a 30 volt output, merely depending on the printed circuit board 210 and/or connectors 304 used.

In view of the six different configurations of the output stage of the present invention, assuming 10 volts generated across each single turn secondary, 10, 20 30, 40, 60, and 120 volt outputs can be achieved. The voltage provided across each section of the secondary winding depends on the input voltage, the topology of the primary stage, the duty cycle and frequency of switching signals applied to the switches 106, 108, 110, and 112, and the turns ratios of the primary and secondary winding sections. Each configuration of the output stage uses the same elements; changing from one configuration to another merely requires changing a printed circuit board having different lead patterns. Thus, the output stage of the present invention uses common parts in each of the different configurations. Moreover, the relatively expensive magnetic components, namely, the primary 118–120 and secondary winding sections, as well as the inductors 204 are typically used in each configuration. Only some of the relatively inexpensive components, such as diodes and capacitors, are not used in certain configurations. The inductors 204a–204f, as well as the capacitors 206a–206f may be arranged in many combinations of series and parallel connections with the proper conductor patterns on the printed circuit board 210. Since there are so many possible connections of these elements, each possible connection has not been explicitly shown. Just two examples of the possible arrangements of the inductors 204a–204f are shown in FIGS. 9a and 10a. However, the possible connections of these elements will be apparent to those skilled in the art.

Figure 11:
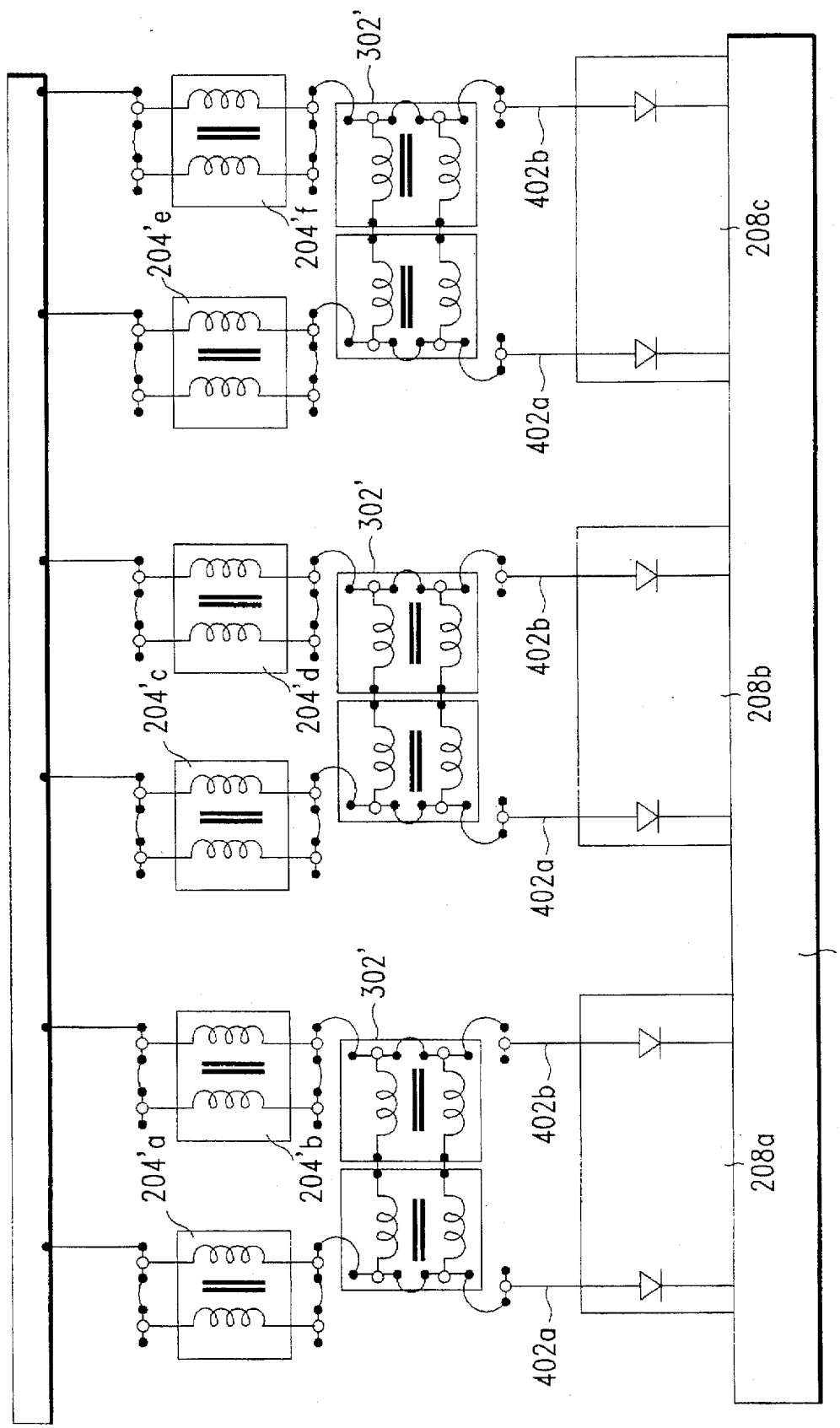
FIG. 11 is a schematic of an alternative embodiment of the present invention in which a pair of secondaries includes a pair of bifilar windings, each of the bifilar windings being wound about a common bobbin and connected in a parallel, current doubler arrangement.

FIG. 11 is a schematic of an alternative embodiment of the present invention in which each of a pair of secondaries includes a bifilar winding which is wound about a common bobbin and connected in a parallel, voltage doubler arrangement. Thus, in this embodiment, the stamped copper sheet, "planar magnetics", secondaries 302, are replaced with dual (or bifilar) winding secondaries 302' in which a single core or bobbin accommodates two separate, but magnetically coupled, windings. Moreover, the inductors 204 may be replaced with dual (or bifilar) winding inductors 204' in which two separate windings are magnetically coupled.

Although a parallel, current doubler configuration is shown in FIG. 11, other output configurations (e.g., series current doubler, parallel and series full bridge, and parallel and series voltage doubler) can be arranged, again, by merely using a printed circuit board 210 having appropriate conductor patterns.

The embodiment of FIG. 11 is advantageous because more different arrangements of the secondary windings are possible. Although the bifilar windings sharing a common bobbin are coupled in parallel in FIG. 11, the problem of circulating currents does not exist because the number of windings are the same and because they share the same magnetics and therefore carry the same current.

Figure 12A:
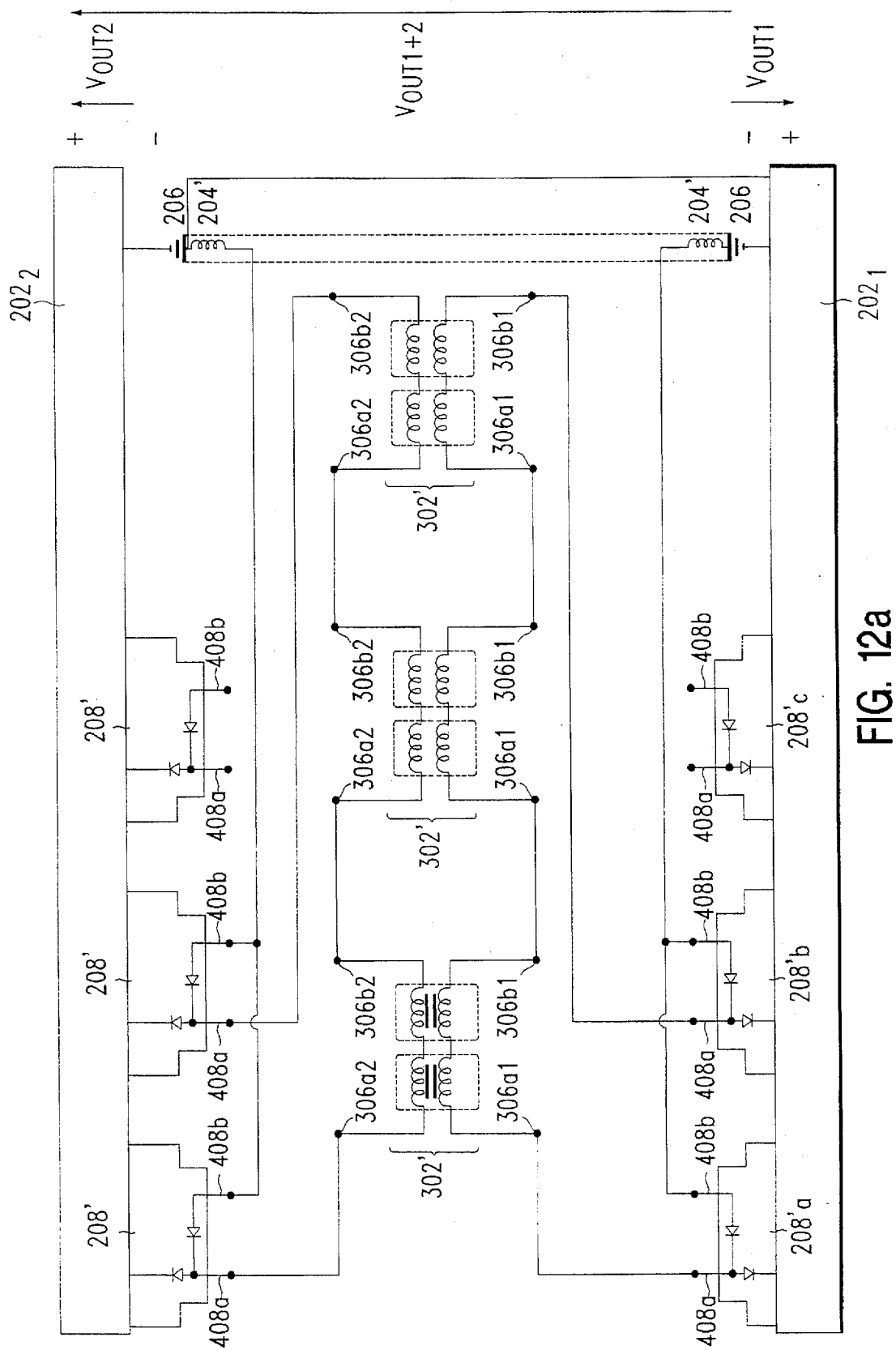
FIGS. 12a and 12b are schematics of the alternative embodiment of the present invention in which a pair a secondaries includes a pair of bifilar windings, each of the bifilar windings being wound about a common bobbin and configured an a double, series full bridge arrangement.
Figure 12B:
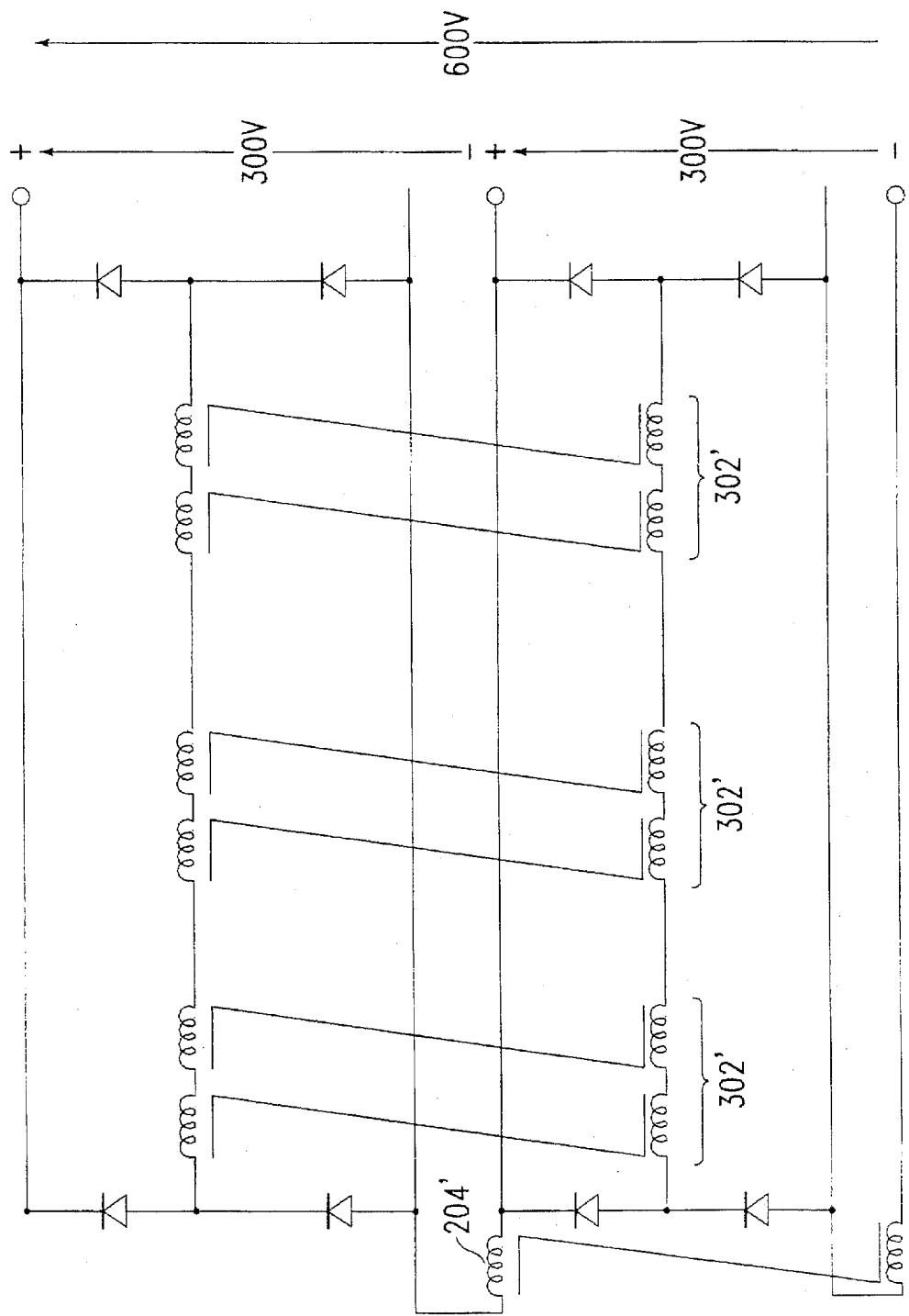

FIGS. 12a and 12b are schematics of an alternative embodiment of the present invention in which a pair of secondaries 302' is wound about a common bobbin and connected in a double, series, full bridge configuration. In FIG. 12a, the dotted lines surrounding windings indicate that the windings are bifilar, sharing the same bobbin. As indicated by the "Z" notation in FIG. 12b, the secondaries sharing a common bobbin are inductively coupled, as are the inductors 204' sharing a common bobbin.

As shown in FIG. 12a, to realize a double, series, full bridge configuration, a first winding of a first bifilar winding secondary pair 302' has a first terminal 306a1 coupled with the first terminal 408a of a series, head-to-tail, dual diode package 208'a. The second terminal 306b1 of the first winding of the first bifilar winding secondary pair 302' is coupled with a first terminal 306a1 of a first winding of a second bifilar winding secondary pair 302'. The second terminal 306b1 of the first winding of the second bifilar winding secondary pair 302' is coupled with a first terminal 306a1 of a first winding of a third bifilar winding secondary pair 302'. The second terminal 306b1 of the first winding of the third bifilar winding secondary pair 302' is coupled with a first terminal 408a of a second series, head-to-tail, dual diode package 208'b. The second terminal 408b of the first and second series, head-to-tail, dual diode packages 208'a and 208'b, respectively, are coupled, via a first winding of a bifilar inductor 204' and at least one capacitor 206 to a first heat sink $202_1$. The second windings of the three bifilar winding pairs 302' are similarly coupled with series, head-to-tail, dual diode packages 208' arranged on a second heat sink $202_2$. A second terminal of the second winding of the bifilar inductor 204' is coupled with the first heat sink $202_1$.

As shown in FIGS. 12a and 12b, if 50 volts is available across each of the secondary windings, 300 volts is available across the capacitor(s) 206 of the first full bridge, 300 volts is available across the capacitor(s) 206 of the second full bridge, and 600 volts is available across the first terminal of the first full bridge and the second terminal of the second full bridge. Thus, different output voltages are available with a single configuration achieved with a single printed circuit board 210. Other configurations (e.g., double parallel full bridge, double series and parallel voltage doubler, and double series and parallel current doubler) are also possible. Similarly, other multiple output stage configurations can be realized if multi-filar winding secondaries are used. This embodiment of the output stage of the present invention may include additional dual diode packages 208 and/or 208'.

What is claimed is:

1. A configurable output stage for use with a power converter having at least two primary windings, the configurable output stage comprising:

a) a first secondary winding inductively coupled with one of the two primary windings;

b) a second secondary winding inductively coupled with another of the two primary windings;

c) a heat sink;

d) four chokes;

e) three capacitors;

f) four head-to-tail, dual diode packages, each of the four head-to-tail dual diode packages having a first diode having a cathode electrically coupled with the heat sink;

g) two common cathode dual diode packages, each of the two common cathode dual diode packages having a first diode and a second diode, each of the first and second diodes having a cathode electrically coupled with the heat sink; and h) a printed circuit board having a conductor pattern, wherein the conductor pattern of the printed circuit board couples the first and second secondary windings, the heat sink, at least one of the four chokes, at least one of the capacitors, at least one of the four head-to-tail, dual diode packages and/or the two common cathode dual diode packages to form one of a (i) full bridge output circuit with the first and second secondary windings in series, (ii) a full bridge output circuit with the first and second secondary windings in parallel, (iii) a voltage doubler output circuit with the first and second secondary windings in series, (iv) a voltage doubler output circuit with the first and second secondary windings in parallel, (v) a current doubler output circuit with the first and second secondary windings in series, and (vi) a current doubler output circuit with the first and second secondary windings in parallel.

2. The configurable output stage of claim 1 wherein the first secondary winding is multi-filar winding and the second secondary winding is a multi-filar winding.

3. The configurable output stage of claim 1 wherein the first secondary winding is bifilar winding and the second secondary winding is a bifilar winding.

4. The configurable output stage of claim 1 wherein the first secondary winding is a stamped copper sheet and wherein the second secondary winding is a stamped copper sheet.

5. The configurable output stage of claim 1 wherein each of the four series, head-to-tail, dual diode packages and the two common cathode dual diode packages are bolted with the heat sink.

6. A configurable output stage kit for use with a power converter having two primary windings, the configurable output stage kit comprising:

a) a first secondary winding inductively coupled with one of the two primary windings;

b) a second secondary winding inductively coupled with another of the two primary windings;

c) a heat sink;

d) four chokes;

e) three capacitors;

f) four head-to-tail, dual diode packages, each of the four head-to-tail dual diode packages having a first diode having a cathode electrically coupled with the heat sink;

g) two common cathode dual diode packages, each of the two common cathode dual diode packages having a first diode and a second diode, each of the first and second diodes having a cathode electrically coupled with the heat sink;

h) a first printed circuit board having a conductor pattern which couples the first and second secondary windings, the heat sink, at least one of the four chokes, at least one of the three capacitors, and two of the series, head-to-tail, dual diode packages to form a full bridge output circuit with the first and second secondary windings in series;

i) a second printed circuit board having a conductor pattern which couples the first and second secondary windings, the heat sink, at least one of the four chokes, at least one of the three capacitors and the four series, head-to-tail, dual diode packages to form a full bridge output circuit with the first and second secondary windings in parallel;

j) a third printed circuit board having a conductor pattern which couples the first and second secondary windings, the heat sink, at least one of the four chokes, three capacitors and one of the four series, head-to-tail, dual diode packages to form a voltage doubler output circuit with the first and second secondary windings in series;

k) a fourth printed circuit board having a conductor pattern which couples the first and second secondary windings, the heat sink, at least one of the four chokes, the three capacitors and two of the four series, head-to-tail dual diode packages to form a voltage doubler output circuit with the first and second secondary windings in parallel;

l) a fifth printed circuit board having a conductor pattern which couples the first and second secondary windings, the heat sink, at least two of the four chokes, at least one of the three capacitors and one of the two common cathode dual diode packages to form a current doubler output circuit with the first and second secondary windings in series; and m) a sixth printed circuit board having a conductor pattern which couples the first and second secondary windings, the heat sink, four chokes, at least one of the three capacitors and the two common cathode dual diode packages to form a current doubler output circuit with the first and second secondary windings in parallel, wherein one of the first, second, third, fourth, fifth, or sixth printed circuit boards is used to configure the configurable output stage kit into an output circuit associated with the used one of the first, second, third, fourth, fifth, or sixth printed circuit boards.

7. The configurable output stage of claim 6 wherein the first secondary winding is multi-filar winding and the second secondary winding is a multi-filar winding.

8. The configurable output stage of claim 6 wherein the first secondary winding is bifilar winding and the second secondary winding is a bifilar winding.

9. The configurable output stage of claim 6 wherein the first secondary winding is a stamped copper sheet and wherein the second secondary winding is a stamped copper sheet.

10. The configurable output stage of claim 6 wherein each of the four series, head-to-tail, dual diode packages and the two common cathode dual diode packages are bolted with the heat sink.

11. A configurable output stage for use with a power converter having at least two primary windings, the configurable output stage comprising:

a) a first secondary winding inductively coupled with one of the two primary windings;

b) a second secondary winding inductively coupled with another of the two primary windings;

c) a heat sink;

d) four chokes;

e) three capacitors;

f) four head-to-tail, dual diode packages, each of the four head-to-tail dual diode packages having a first diode having a cathode electrically coupled with the heat sink;

g) two common cathode dual diode packages, each of the two common cathode dual diode packages having a first diode and a second diode, each of the first and second diodes having a cathode electrically coupled with the heat sink; and h) a system of jumpers, wherein the system of jumpers couples the first and second secondary windings, the heat sink, at least one of the four chokes, at least one of the capacitors, at least one of the four head-to-tail, dual diode packages and/or the two common cathode dual diode packages to form one of a (i) full bridge output circuit with the first and second secondary windings in series, (ii) a full bridge output circuit with the first and second secondary windings in parallel, (iii) a voltage doubler output circuit with the first and second secondary windings in series, (iv) a voltage doubler output circuit with the first and second secondary windings in parallel, (v) a current doubler output circuit with the first and second secondary windings in series, and (vi) a current doubler output circuit with the first and second secondary windings in parallel.

12. The configurable output stage of claim 11 wherein the first secondary winding is multi-filar winding and the second secondary winding is a multi-filar winding.

13. The configurable output stage of claim 11 wherein the first secondary winding is bifilar winding and the second secondary winding is a bifilar winding.

14. The configurable output stage of claim 11 wherein the first secondary winding is a stamped copper sheet and wherein the second secondary winding is a stamped copper sheet.

15. The configurable output stage of claim 11 wherein each of the four series, head-to-tail, dual diode packages and the two common cathode dual diode packages are bolted with the heat sink.

* * * * *